(12) United States Patent
Malm

(10) Patent No.: US 8,099,859 B2
(45) Date of Patent: Jan. 24, 2012

(54) MODULAR ASSEMBLY

(76) Inventor: Robert E. Malm, Pacific Palisades, CA (US)

( * ) Notice: Subject to any disclaimer, the term of this patent is extended or adjusted under 35 U.S.C. 154(b) by 657 days.

(21) Appl. No.: 11/860,112

(22) Filed: Sep. 24, 2007

(65) Prior Publication Data

US 2009/0077808 A1    Mar. 26, 2009

(51) Int. Cl.
   *B23P 19/00* (2006.01)
(52) U.S. Cl. ............... 29/739; 29/428; 29/897; 29/816; 901/1; 361/625; 361/728; 700/245; 174/48
(58) Field of Classification Search ...... 901/1; 361/625, 361/728–733; 174/48; 700/245, 247; 29/428, 29/897, 897.31, 739, 741, 747, 816
   See application file for complete search history.

(56) References Cited

U.S. PATENT DOCUMENTS

| | | | | |
|---|---|---|---|---|
| 4,997,240 A | * | 3/1991 | Schmalzl et al. | 312/265.4 |
| 5,055,059 A | * | 10/1991 | Logstrup | 439/214 |
| 5,298,681 A | * | 3/1994 | Swift et al. | 174/97 |
| 5,466,889 A | * | 11/1995 | Faulkner et al. | 174/68.2 |
| 5,755,535 A | * | 5/1998 | Fox | 405/288 |
| 7,518,060 B1 | * | 4/2009 | Miller et al. | 174/58 |
| 2003/0046802 A1 | * | 3/2003 | Chernoff et al. | 29/428 |
| 2007/0212910 A1 | * | 9/2007 | Tracy et al. | 439/157 |
| 2008/0046120 A1 | * | 2/2008 | Mangelsen et al. | 700/245 |
| 2008/0197702 A1 | * | 8/2008 | Banach | 307/11 |
| 2008/0223630 A1 | * | 9/2008 | Couture et al. | 180/9.32 |

* cited by examiner

*Primary Examiner* — Derris Banks
*Assistant Examiner* — Jeffrey T Carley
(74) *Attorney, Agent, or Firm* — Robert E. Malm

(57) ABSTRACT

The invention is a modular assembly of modular objects for autonomously executing a variety of tasks. The modular assembly consists of a modular object called a platform, one or more modular objects called modules which are mounted to the platform in accordance with a modular assembly system, and a modular bus system for distributing electrical power and electrical signals among the modular objects in the modular assembly. The modular assembly system utilizes modular object fasteners (MOFs) and MOF-accommodating features of modular objects for facilitating the attachment of a plurality of modular objects to one another thereby creating a modular assembly in any one of a variety of configurations, an MOF being activatable when object attachment surfaces associated with two modular objects are superimposed and two object attachment points on the object attachment surfaces coincide.

25 Claims, 15 Drawing Sheets

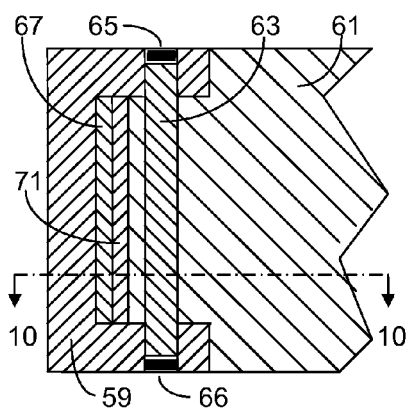
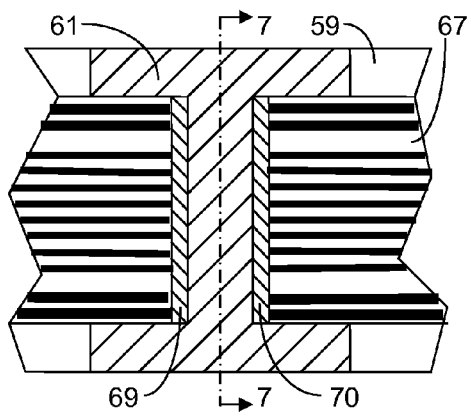
FIG. 7   FIG. 6
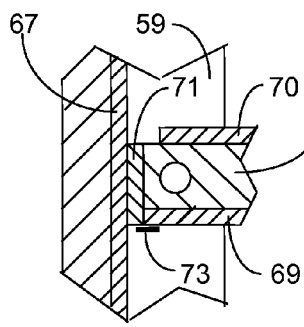
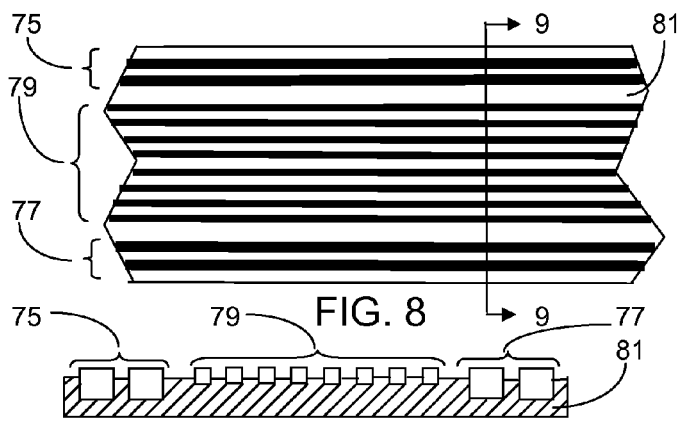
FIG. 10   FIG. 8 / FIG. 9
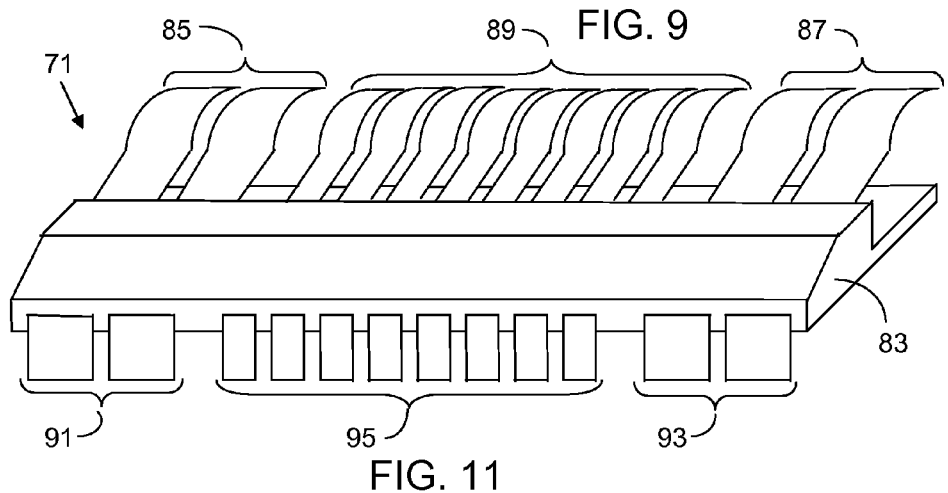
FIG. 11

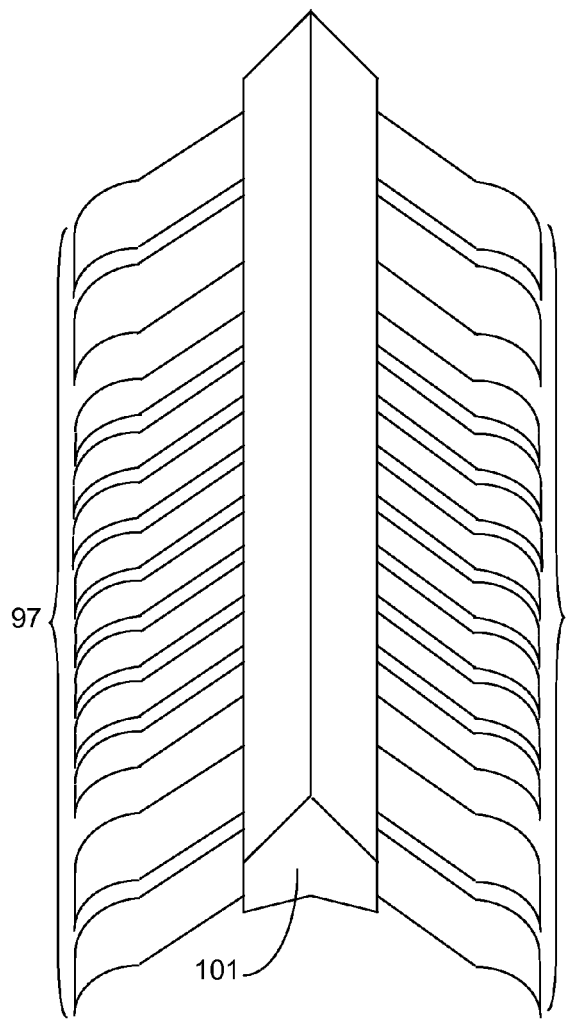
FIG. 12
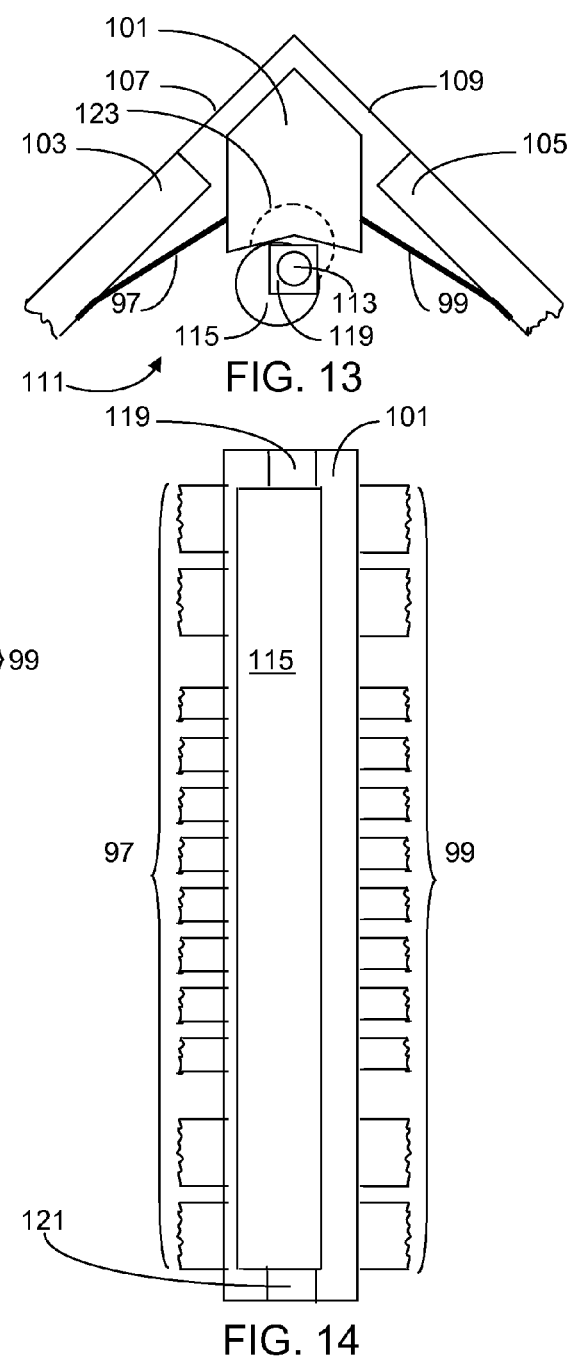
FIG. 13
FIG. 14

FIG. 21
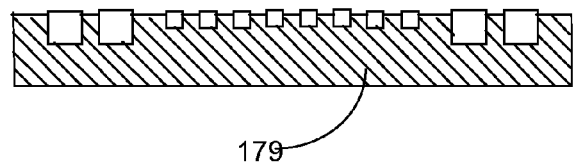
FIG. 22
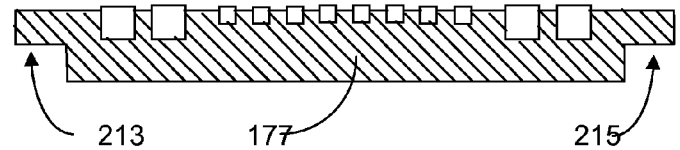
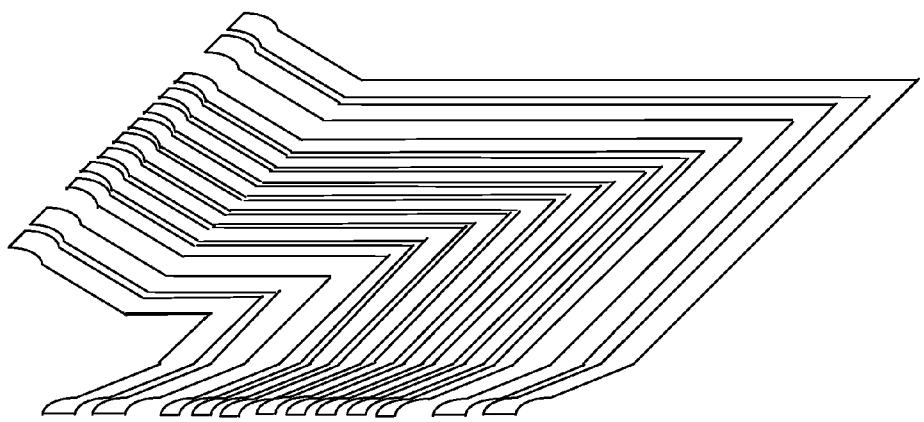
FIG. 23
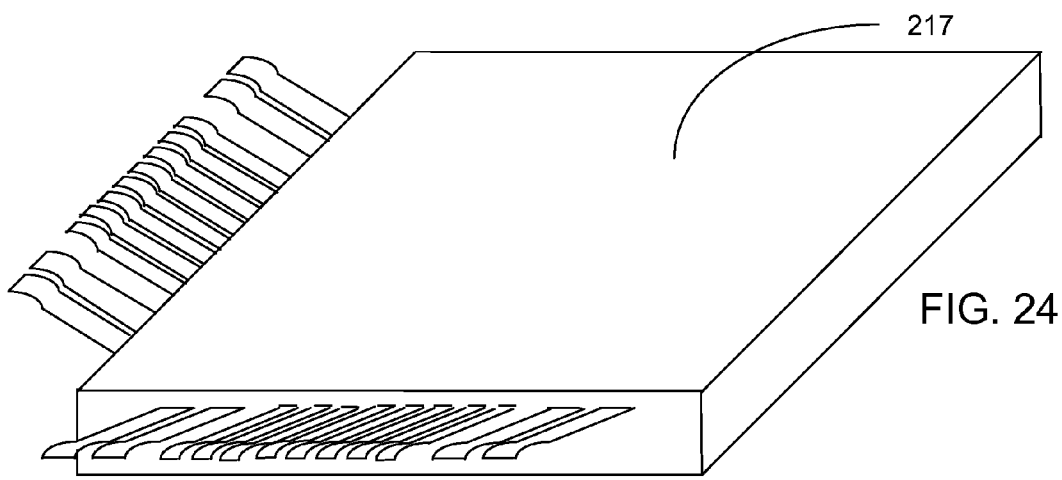
FIG. 24

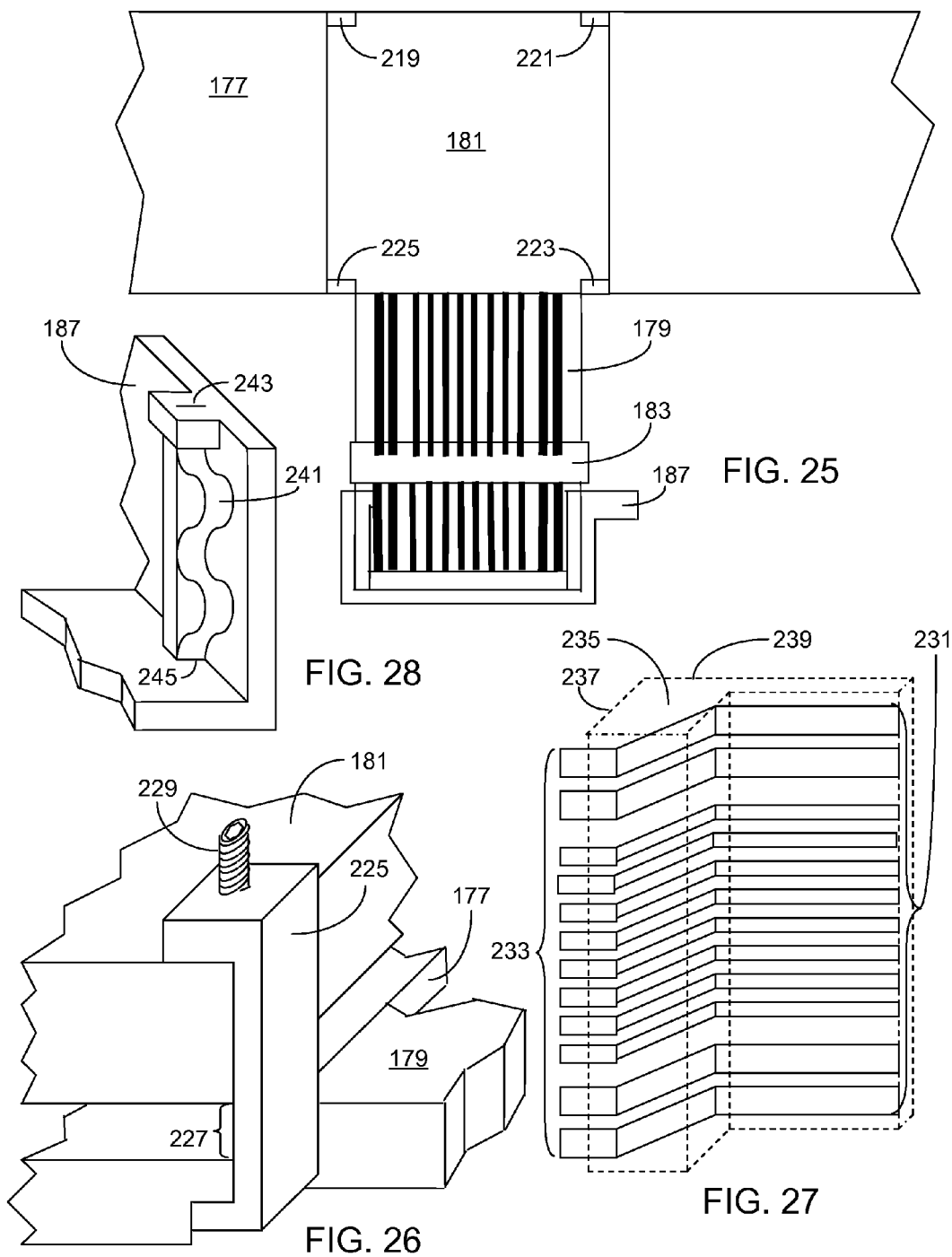

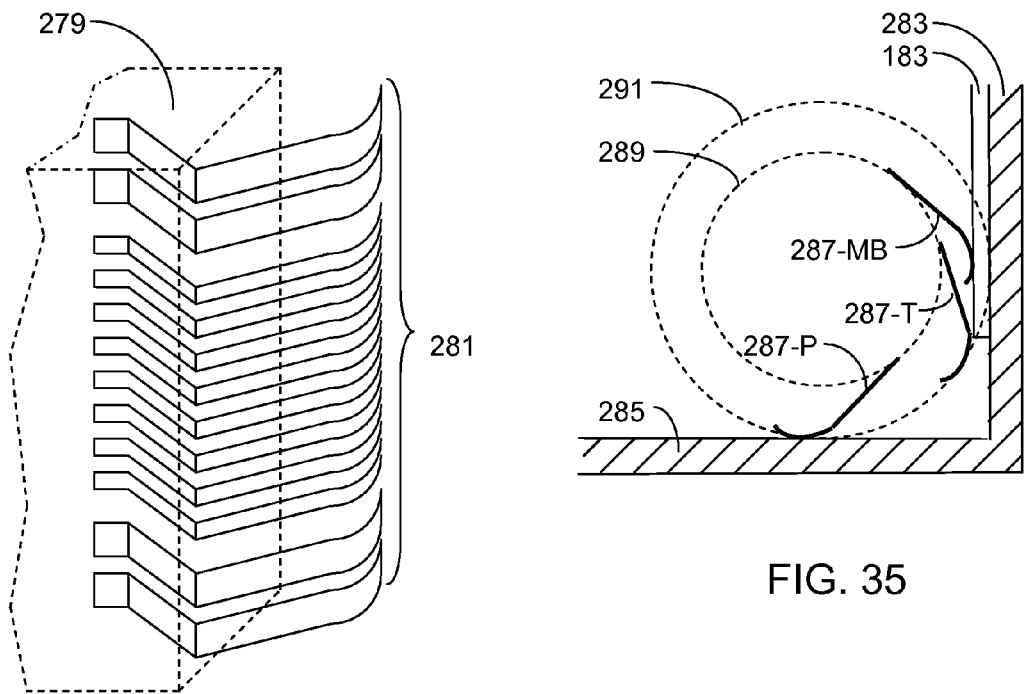
FIG. 34
FIG. 35
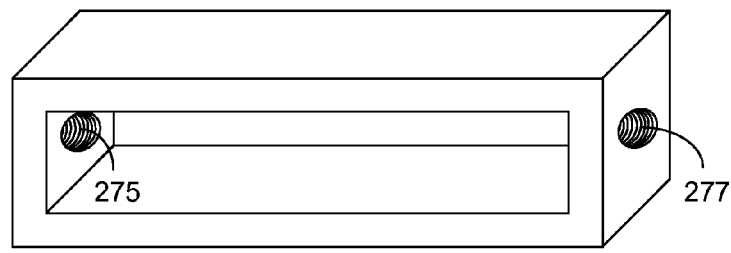
FIG. 33

MODULAR ASSEMBLY

CROSS-REFERENCE TO RELATED APPLICATIONS (Not Applicable)

STATEMENT REGARDING FEDERALLY SPONSORED RESEARCH AND DEVELOPMENT (Not Applicable)

REFERENCE TO SEQUENCE LISTING, A TABLE, OR A COMPUTER PROGRAM LISTING COMPACT DISC APPENDIX (Not Applicable)

BACKGROUND OF THE INVENTION

This invention pertains to an assembly of modular objects for autonomously executing a variety of tasks. Such an assembly is sometimes referred to as a robot—"a machine or mechanical device that operates automatically with human-like skill." The Random House College Dictionary, Revised Edition, Random House, Inc., New York, N.Y. (1988).

Present-day robots are designed to perform specialized tasks such as vacuuming a carpeted room, mowing a lawn, storing and retrieving goods in warehouses, obtaining and delivering goods in the course of manufacturing operations, and performing operations in connection with the making of parts and the assembly of machines. Specialized designs of robots for the performance of specialized tasks will be an insurmountable economic burden to the widespread use of robots in the future unless a way is found to design robots to perform a multitude of tasks utilizing the same basic configuration.

BRIEF SUMMARY OF THE INVENTION

The invention is a modular assembly of modular objects for autonomously executing a variety of tasks. The modular assembly consists of a modular object called a platform, one or more modular objects called modules which are mounted to the platform in accordance with a modular assembly system, and a modular bus system for distributing electrical power and electrical signals among the modular objects in the modular assembly. The modular assembly system utilizes modular object fasteners (MOFs) and MOF-accommodating features of modular objects for facilitating the attachment of a plurality of modular objects to one another thereby creating a modular assembly in any one of a variety of configurations, an MOF being activatable when object attachment surfaces associated with two modular objects are superimposed and two object attachment points on the object attachment surfaces coincide.

The modular assembly system facilitates the detachment of modular objects in an assembly and the reattachment of the same or different modular objects to form a different configuration of the modular assembly or a different modular assembly.

The modular object called a platform consists of a frame of interconnected beams and any cross-members attached to the frame, the frame being amenable to the attachment and detachment of cross-members within the frame. Beams and cross-members are structural members consisting of one or more parallel flanges and one or more webs normal to the flanges. Coplanar exterior surfaces of the flanges of the beams and cross-members constitute object attachment surfaces with object attachment points thereon. The web surfaces of the beams and cross-members constitute bus attachment surfaces.

One or more modular objects called modules having at least one object attachment surface is attachable to a platform or to another module when one or more of the object attachment points on an object attachment surface of the module coincide with one or more object attachment points on an object attachment surface of the platform or the other module;

The modular bus system consists of modular-object bus systems attached to one or more bus-attachment surfaces within each modular object, one or more inter-object bus connectors for electrically connecting the plurality of modular-object bus systems to one another, and one or more intra-object bus connectors for enabling the flow of electrical power and electrical signals between the bus system of a modular object and the units within the modular object.

BRIEF DESCRIPTION OF THE SEVERAL VIEWS OF THE DRAWINGS

FIG. 6 shows a sectional view of a cross-member attached to a frame in a plane normal to the cross-member.

FIG. 7 shows a sectional view of a cross-member attached to a frame in the plane of the web of the cross-member.

FIG. 8 shows a view of the electrical bus that is attached to interior surfaces of the frame and cross-members for the transmission of power and control signals among modules.

FIG. 9 shows a sectional view of the bus of FIG. 8.

FIG. 10 shows a sectional view of how a cross-member bus is connected to a frame bus.

FIG. 11 is a three-dimensional view of the cross-member bus connector which connects a cross-member bus to another cross-member bus or to the frame bus.

FIG. 12 is a three-dimensional view of the corner bus connector utilized in connecting the frame buses at the corners of the frame.

FIG. 13 is a top view of a frame corner showing how the corner bus connector attaches to the frame and makes contact with the frame buses.

FIG. 14 is a front view of the corner bus connector shown in FIG. 13.

FIG. 21 is a sectional view of a bus which may be used as either a frame bus or a junction bus.

FIG. 22 is a sectional view of a module bus.

FIG. 23 is a perspective view of the fingers of a junction bus connector.

FIG. 24 is a perspective view of a junction bus connector.

FIG. 25 shows a junction bus termination connected to a junction bus which is connected to a module bus.

FIG. 26 shows how a junction bus connector attaches to a module bus.

FIG. 27 is a perspective view of the junction bus termination.

FIG. 28 shows how a junction bus connector is held in position against a module wall by the pivoting bus connector frame.

FIG. 33 is a perspective view of the yoke of the pivoting bus connector.

FIG. 34 is a perspective view of the pivoting bus connector fingers.

FIG. 35 shows how the pivoting bus connector connects to a module bus.

DETAILED DESCRIPTION OF THE INVENTION

The invention is a modular assembly comprising a platform and a variety of modules which can easily be attached to and detached from the platform thereby permitting a user to easily put together a modular assembly to perform a particular task or a variety of tasks by the appropriate selection of modules.

Figure 1:
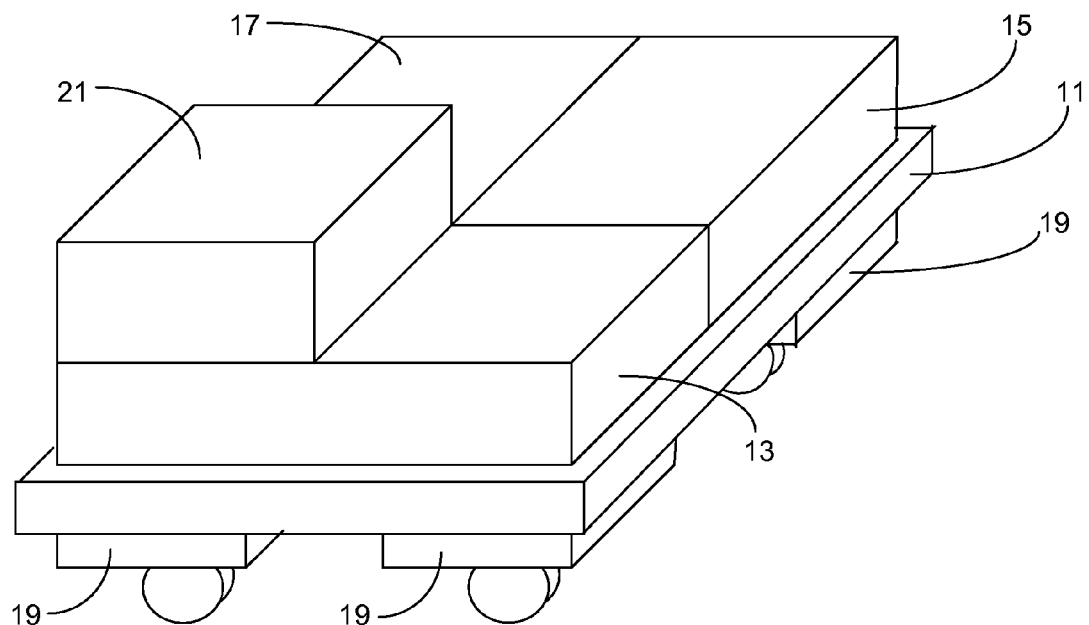
FIG. 1 is a three-dimensional view of a modular assembly.

A simple example of the preferred embodiment of the invention is shown in FIG. 1. It consists of platform 11, power module 13, navigation module 15, guidance & control module 17, four mobility modules 19 (three of which are shown in the figure), and task module 21. A modular assembly may not need to move in order to perform its assigned tasks, in which case there would be no need for mobility modules. In some situations one might want to exercise overall control of the modular assembly with an external controller which would communicate with the modular assembly by means of wires or wirelessly.

Power module 13 supplies all of the power required by the modules. Depending on the power requirements of the modular assembly, it might be simply a storage battery or a hybrid arrangement of storage batteries and a generator driven by an internal combustion engine. If a variety of AC and DC voltages are required by the modules, then power module 13 would also include appropriate inventers and converters.

Navigation module 15 continually determines the position and velocity of the modular assembly and supplies this data to guidance & control module 17 which in turn generates control data for the mobility modules 19 which will cause the assembly to follow the path appropriate for performing the tasks assigned to the modular assembly.

Each of the mobility modules 19 consists of an independently-suspended caster which utilizes separate electric motors to control the caster direction and the caster wheel rotation rate. The mobility modules 19 are mounted on the bottom of the platform in contrast to the top mounting of the other modules. The mobility modules are of the caster type and can be confined to the region immediately below the platform 11 as shown in the figure. However, there is no requirement that any of the modules must be confined to the regions either immediately above or below the platform. If the mobility modules are based on an automotive-type suspension, the wheels associated with the mobility modules will necessarily be outside of the platform perimeter.

The platform consists of a frame of interconnected beams where a beam is a structural member designed to resist bending. The component parts of a beam are one or more parallel flanges connected together by one or more webs normal to and attached to the flanges. In applications where the beams are to resist the force of gravity, the flanges are horizontal and the web is vertical. An I-beam has two flanges top and bottom with a web centered between them. A C-beam (or channel) has two flanges, top and bottom, with a web connecting the ends of the flanges. A T-beam has a single flange and a web connected at the center of the flange. An L-beam (or angle) has a single flange with a web connected to the end. A BOX-beam has two flanges connected at the ends to the ends of two webs thereby forming a box-like section. There are many variations of these structures which may be used for the platform of this invention.

Figure 2:
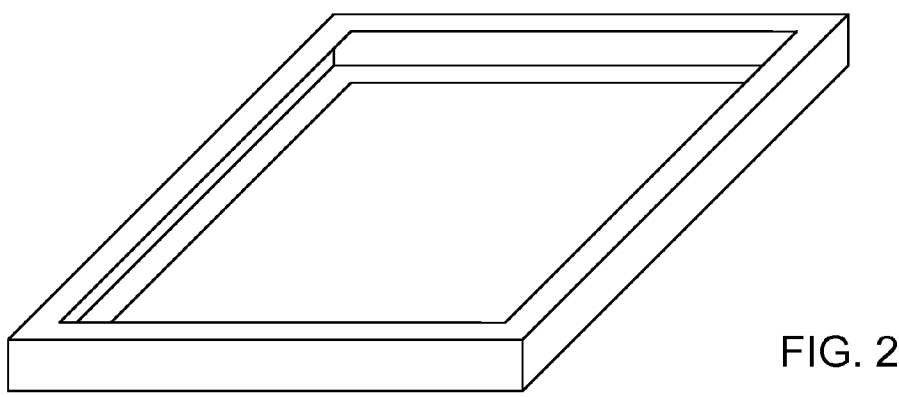
FIG. 2 is a three-dimensional view of a frame for a modular assembly.

An example of the use of C-beams as the basis of the platform structure is the rectangular frame shown in FIG. 2. A platform customized for the particular set of modules shown in FIG. 1 is obtained by inserting I-beam cross-members in the frame as shown in the top view of FIG. 3.

Cross-members 25 and 27 (together with the frame) provide support for modules 13, 15, and 17. Cross-members 29, 31, and 33 (together with the frame) provide support for the front two mobility modules 19. Cross-members 35 and 37 (together with the frame) provide support for left rear mobility module 19, and cross-members 39 and 41 (together with the frame) provide support for right rear mobility module 19.

Figure 3:
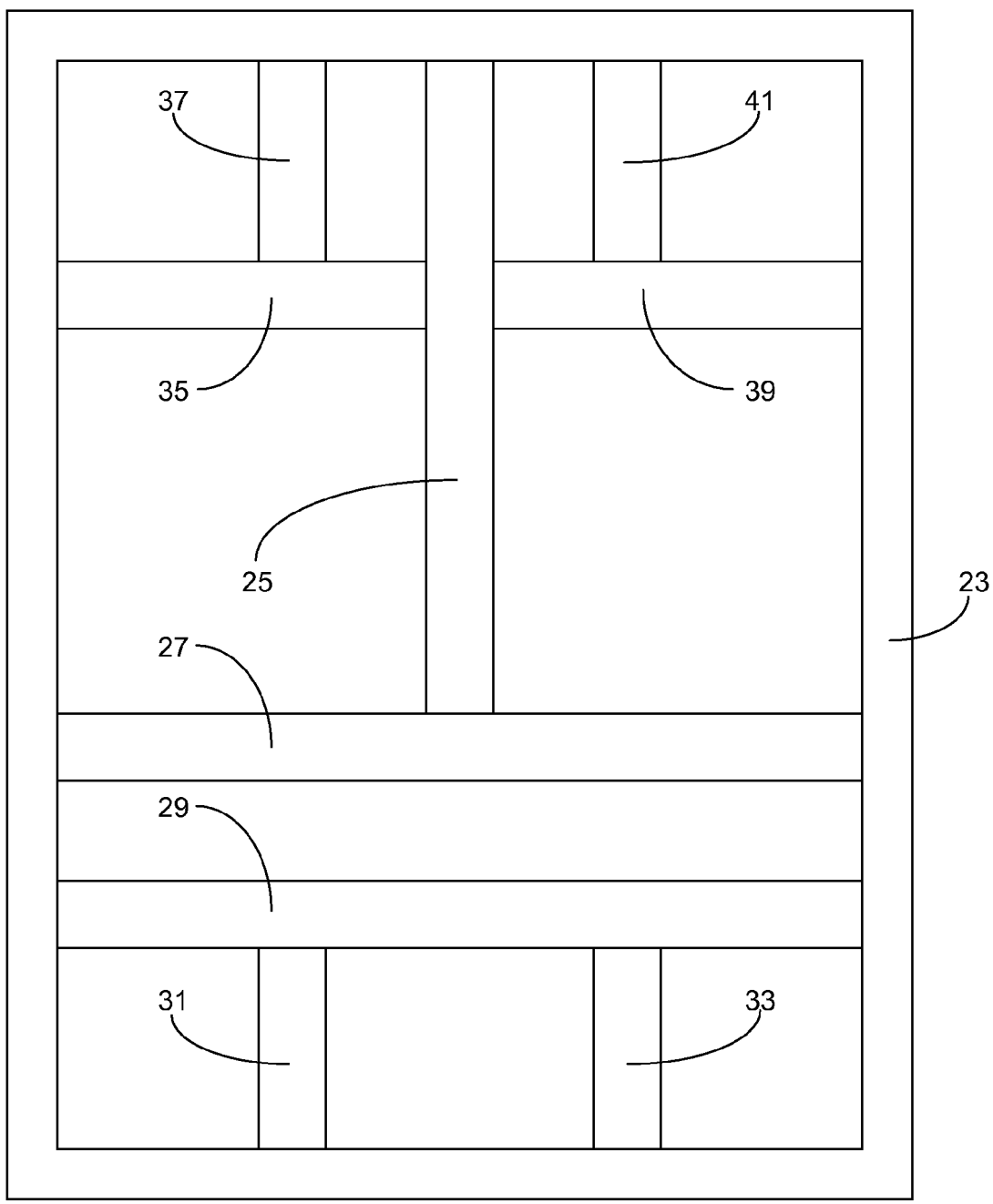
FIG. 3 is a plan view of a platform for a modular assembly consisting of a frame and cross-members.
Figure 4:
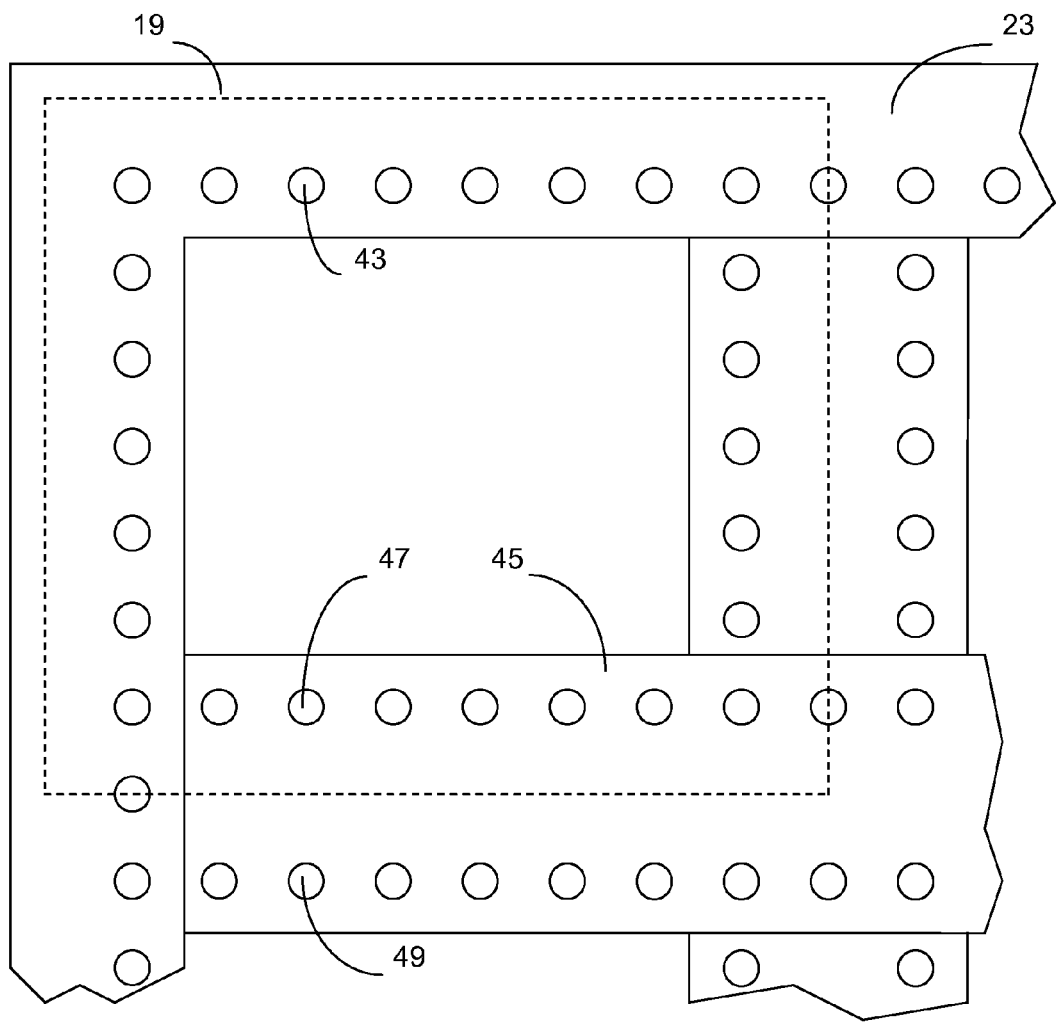
FIG. 4 shows the arrangement of holes in the frame and cross-members of a platform which provides the basis for the assembly of the platform and the attachment of modules to the platform.

A top view of the upper left corner of the platform shown in FIG. 3 is shown in FIG. 4. Frame 23 has holes as shown (typical frame hole 43) spaced at regular intervals on its entire perimeter. The holes pass through both flanges of the channel and are partially threaded at both top and bottom. The cross-members (typical cross-member 45) also have partially-threaded holes (typical cross-member hole 47), with the same regular spacing as the frame and aligned with the frame holes after the cross-member is inserted into the frame. The cross-member holes are on both sides of the web and aligned (see typical aligned cross-member holes 47 and 49).

Figure 5:
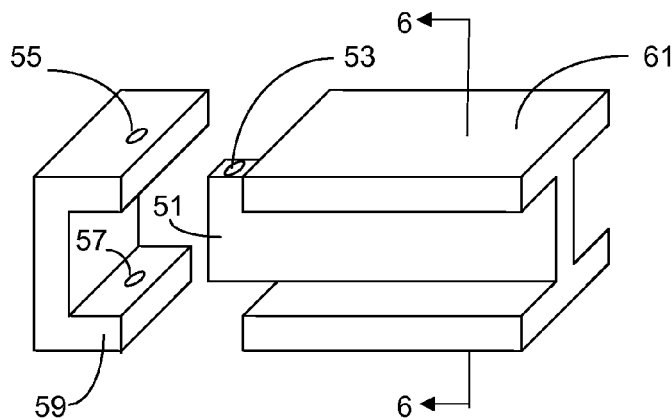
FIG. 5 shows how an I-shaped cross-member fits into a channel-shaped frame.

The flanges of the end portions of the cross-members are removed leaving only the webs as shown for one end in FIG. 5. Each cross-member end 51 has a hole 53 through the web which aligns with top and bottom holes 55 and 57 of frame segment 59 or similar holes of another cross-member when the cross-member is fully-inserted into the frame or other cross-member (see FIG. 5).

The dashed outline 19 (FIG. 4) shows the outline of the left rear mobility module (see FIG. 1) relative to the platform.

A cross-member can be quickly attached to the frame, to the frame and another cross-member, or to two other parallel cross-members by inserting and screwing threaded pins into pre-drilled and partially threaded holes in the frame and cross-members. The attachment of one end of a cross member 61 to a frame 59 (see FIG. 5) proceeds by inserting the end 51 of cross-member 61 into frame 59.

A sectional view of the frame 59 and cross-member 61 after insertion in a plane normal to the cross-member longitudinal axis is shown in FIG. 6. A sectional view in the central plane of the cross-member web is as shown in FIG. 7. The cross-member is secured to the frame by pin 63 which is threaded at one end with a recess in the threaded end which accepts an Allen wrench. The pin is passed through the holes in the frame and the cross-member and then secured to the frame by causing the pin threads to fully engage the threads 65 in the threaded region of the frame hole. Pin 63 does not extend into the threads 66 of bottom frame hole 57 (see FIGS. 5 and 7). Pin 63 may alternatively be inserted through hole 57 and secured in position by engagement with threads 66 in bottom frame hole 57.

The attachment of a cross-member to another cross-member is accomplished in the same way.

The frame need not be constrained to two dimensions as illustrated in FIG. 2. The frame may assume any three-dimensional configuration that can be achieved with structures of beams. The only requirement is that the beam structure accommodate module attachment points (corresponding to the mounting holes shown in the drawings) in the module mounting surfaces of the structure that are congruent with a subset of a grid of attachment points equally-spaced in the two dimensions of a two-dimensional Cartesian-coordinate system.

Nor does the frame need to be constrained to the simple rectangular shape shown in FIG. 2. The frame may be of any geometrical shape achievable with a structure of beams as long as the attachment-point requirement is satisfied.

The transmission of power and the communication of information among modules is accomplished with buses. Bus 67 and buses 69 and 70 shown in FIG. 6 are identical arrangements of parallel conductors attached to insulating back planes which are in turn attached to the interior web surfaces of the frame and cross-members respectively. One possible bus layout is shown in FIG. 8. It consists of AC power bus 75, DC power bus 77, and data bus 79 attached to bus support structure 81. A sectional view normal to the conductors is shown in FIG. 9.

The current required to provide the mobility desired for a mobile modular assembly may require power bus conductors having dimensions normal to current flow of a centimeter or more. Thus, the size of power bus conductors are likely to be significantly greater than the data bus conductors. In order to simplify the connections to the combination power and data bus, it is desirable that the surfaces of the conductors available for connection be in the same plane as illustrated in FIG. 9. The design of the bus support structure 81 accomplishes this goal.

The connection of a cross-member bus to the frame bus is accomplished with cross-member connector 71 which is shown in the sectional view of FIG. 10 and which is attached to the end of cross-member 61. Tabs 73 abut the sides of the cross-member bus conductors and are either soldered or ultrasonically welded to them. An identical connector is attached to the other end of cross-member 61 and is electrically connected to the cross-member bus conductors on the opposite side of the cross-member web.

The details of the cross-member bus connector 71 are shown in FIG. 11. Flexible DC power connector fingers 85, AC power connector fingers 87, and data connector fingers 89 are held in support structure 83, the ends of which exit the support structure 83 as DC power connector tabs 91, AC power connector tabs 93, and data connector tabs 95 which are soldered or ultrasonically welded to the cross-member bus conductors as described above.

In attaching a cross-member to a frame or to another cross-member, the connector fingers bend and thereby apply pressure to the corresponding bus conductors in the contact region, thereby assuring a good electrical connection between the bus conductors being connected.

The connection of the frame buses at the corners of the frame is accomplished with the corner connector shown in FIG. 12. The corner connector consists of two sets of flexible connector fingers 97 and 99 held in a plastic support structure 101. When installed in a corner of a frame, the connector fingers make individual contact with the bus conductors on each side of the corner as shown in FIG. 13.

Frame buses 103 and 105 are attached adhesively to interior web surfaces 107 and 109 respectively of adjoining frame members at the corner of a frame. The corner connector 111 is initially positioned as shown and held in position by a pin which is inserted through the two corner holes of the frame and hole 113 in cam 115. A front view of the corner connector is shown in FIG. 14. This assembly process is easily accomplished since the connector fingers 97 and 99 are unflexed during the assembly process. Cam 115 is equipped with a square protuberances 119 and 121 at each end of the cam to which a wrench can be applied. By rotating the cam with the aid of a wrench to dashed position 123, the connector support structure 101 moves into the corner thereby causing the connector fingers to flex and make good electrical contact with the bus conductors.

A module such as the ones shown in FIG. 1 has outside width and length dimensions equal to WS and LS respectively where W and L are integers and S is the spacing of the holes in the frame and cross-members. The module may have an arbitrary height. The top and bottom of a module have a rectangular arrangement of holes that can be aligned with those in the platform. The rectangle defined by the hole centers is centered in the module surface with (W-1) holes in the width dimension and (L-1) holes in the length dimension.

Figure 15:
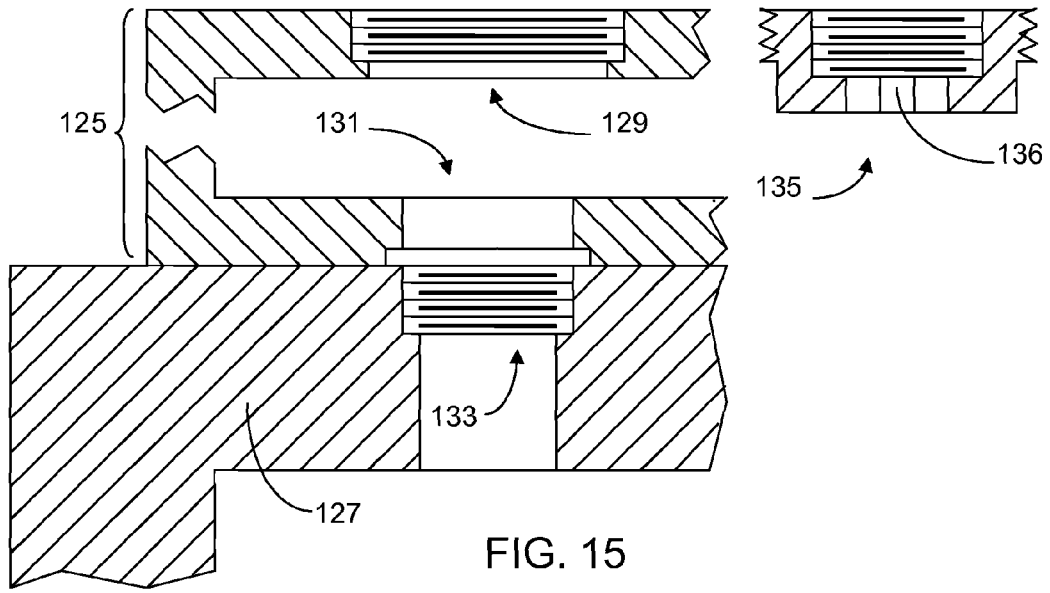
FIG. 15 shows a module in position to be attached to a platform.

The attachment of a module 125 to a platform 127 begins with the alignment of the holes in the module with the holes in the platform where the module is to be attached as illustrated in FIG. 15. Then a shoulder bolt, with the aid of a driving tool, is passed through top hole 129 of module 125 and is caused to enter bottom hole 131 and engage the threaded region 133 of the hole in the platform. This process is then repeated for as many aligned holes as required to provide the requisite attachment security.

In preparation for attaching a module to the top of module 125, reducing bushing 135 is introduced into hole 129 from the top and screwed into the threaded region utilizing an Allen wrench inserted into the hexagonal socket 136 thereby converting the original threaded region into a threaded region which is the same size as the threaded hole regions in the platform. Similarly, reducing bushings are screwed into all of the top holes of module 125 which are to be used in attaching the second module.

Figure 16:
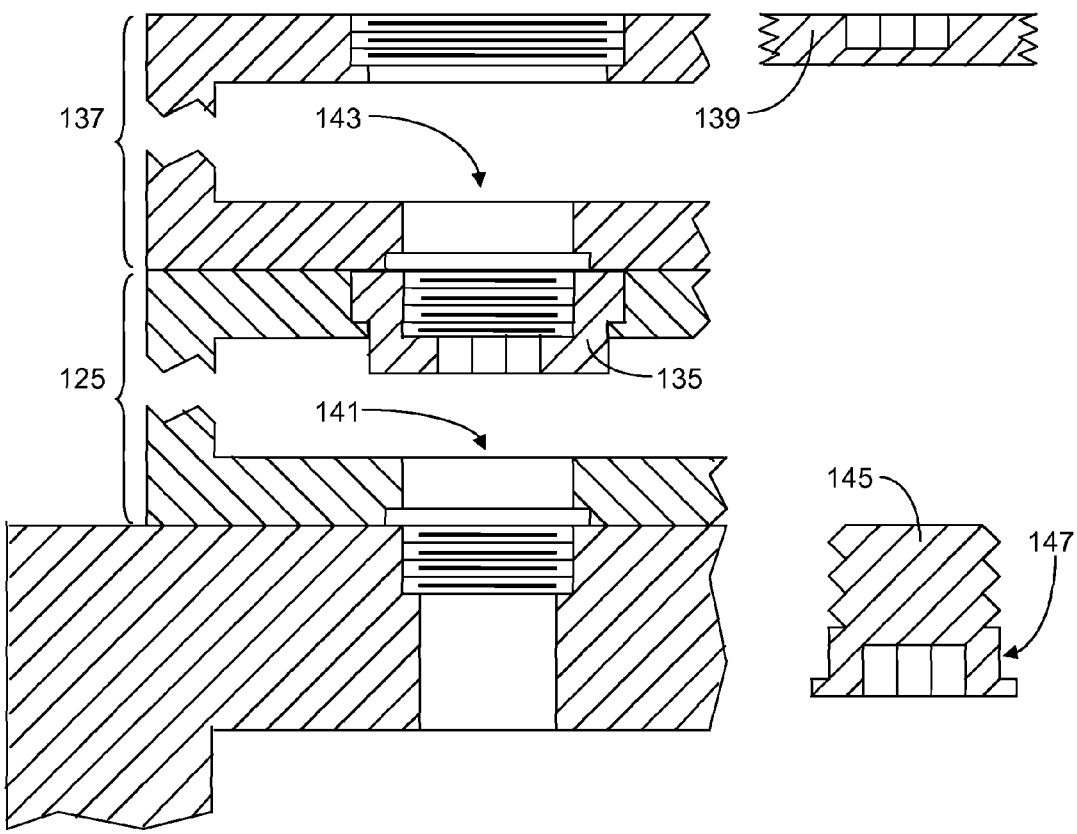
FIG. 16 shows a module in position to be attached to another module.

A second module 137 is shown in FIG. 16 positioned for attachment to module 125. It will be observed that reducing bushing 135 has been installed in the top hole of module 125.

Module 137 is bolted to module 125 in exactly the same way that module 125 was bolted to platform 127 (bolt not shown in figure).

After all of the desired modules have been mounted on the platform, plugs like plug 139 are screwed into all exposed open top holes in the modules in order to maintain dust-free environments within the modules.

Each module includes a bus and a bus connector which can be caused to connect the module's bus to the platform bus system or to the bus of a module on which the module is mounted. The installation of a bus connector in a module is accomplished (prior to attachment of the module to the platform or to another module) by aligning two tapped holes in the bus connector with two of the holes in the bottom of the module and then bolting the bus connector to the module. For example, if one wished to attach a bus connector to either module 125 utilizing hole 141 or module 137 utilizing hole 143, neither hole being intended for use in attaching the associated module to the platform or another module, one would align the two tapped holes of the bus connector with hole 141 (or 143) and an adjacent hole and utilizing shoulder bolts like shoulder bolt 145 to bolt the bus connector to the module using an Allen wrench. The precise positioning of the bus connector with respect to the module is assured by the close fit of the shoulder 147 of the bolt and hole 141 (or 143) and similarly in the case of a second bolt and the adjacent hole.

Each module is equipped with a bus system similar to the platform bus system. A module's bus system consists of four buses adhesively attached to the walls of the module at the same distance from the top of the module as the platform buses are from the surface (either top or bottom) of the platform. Alternatively, the module buses may be attached to the walls of the module by mechanical fasteners of one kind or another. The four busses are electrically connected together by corner connectors.

Figure 17:
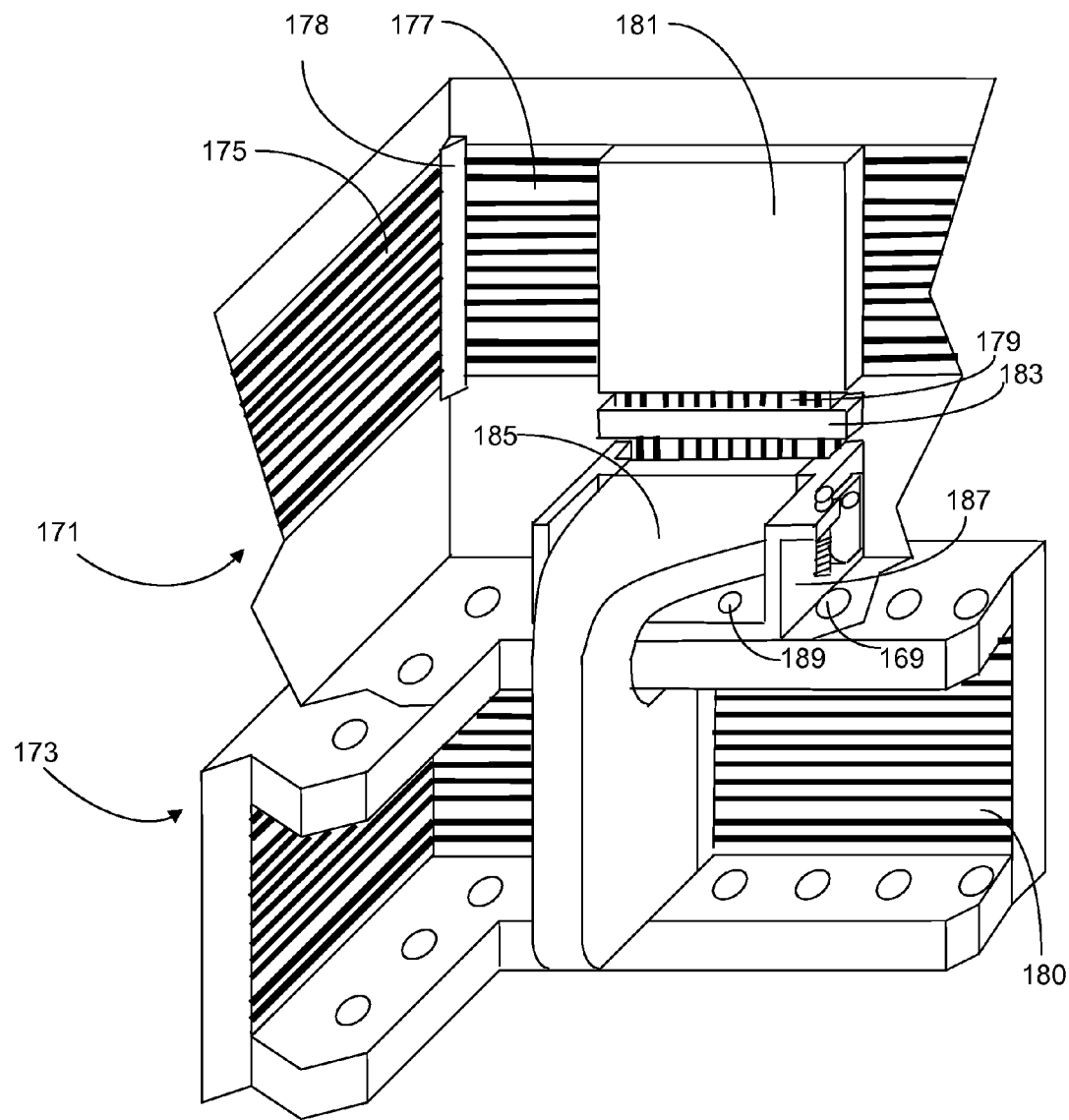
FIG. 17 shows a pivoting bus connector used to electrically connect the platform bus to a module bus.

After a module 171 is mounted to the platform 173, the module bus is electrically connected to the platform bus by pivoting bus connector 185 as shown in FIG. 17. Two of the four interconnected module bus sections 175 and 177 are shown together with junction bus 179, junction bus termination 183, and platform bus 180. The module bus sections 175 and 177 are electrically connected by a corner connector which attaches to corner attachment fixture 178. Junction bus connector 181 connects module bus section 177 to vertically-oriented junction bus 179. Junction bus termination 183 provides an interface between junction bus 179 and pivoting bus connector 185. Pivoting bus connector 185 provides the means for connecting junction bus termination 183 to platform bus 180 after the module has been attached to the platform. The pivoting bus connector frame 187, which supports the pivoting bus connector 185, is attached to a module by shoulder bolts which pass through adjacent holes in module 171 and screw into tapped hole 189 and an adjacent tapped hole which align with the two adjacent holes in the module thereby securely and precisely attaching the pivoting bus connector frame 187 to the module.

Figure 18:
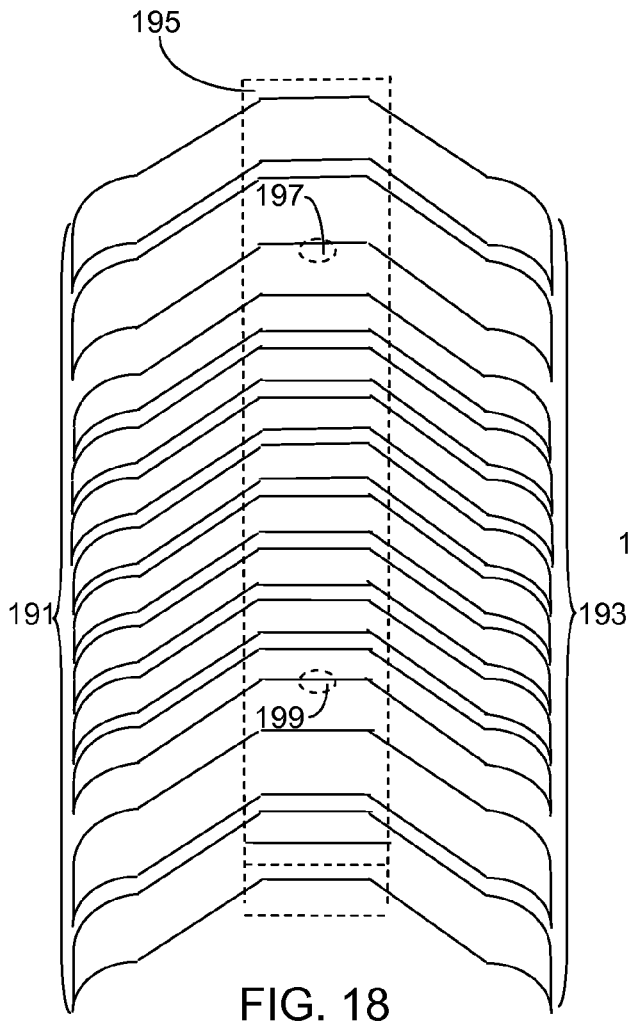
FIG. 18 is a view of the fingers of a corner bus connector used to connect module buses.

The corner bus connector which attaches to corner attachment fixture 178 and connects module bus section 175 to module bus section 177 is detailed in FIG. 18. The view is the backside of the connector showing the surfaces of flexible connector fingers 191 and 193 that make contact with module bus sections 177 and 175 respectively. Plastic corner connector support structure 195 provides support for the molded-in phosphor bronze connector fingers 191 and 193. Holes 197 and 199 provide the means for attaching corner connector support structure 195 to corner attachment fixture 178 (FIG. 17) in a module.

Figure 19:
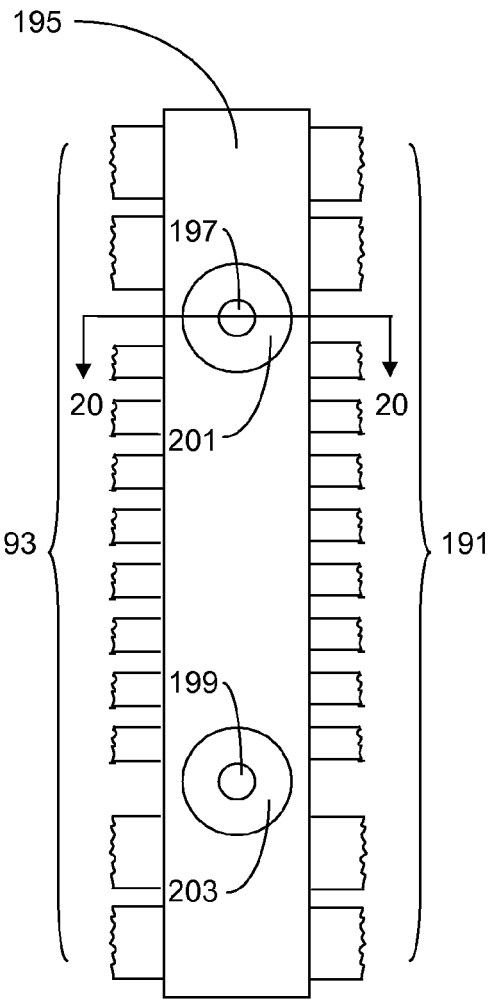
FIG. 19 is a plan view of a corner bus connector used to connect module buses.
Figure 20:
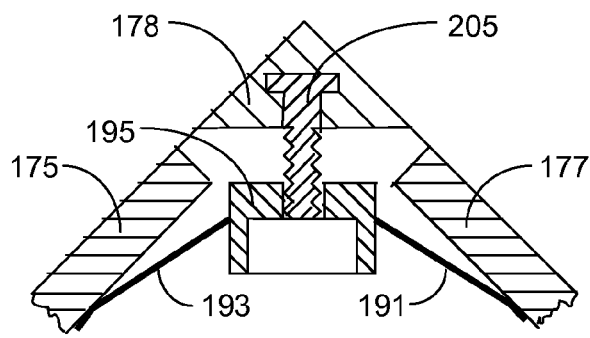
FIG. 20 is a sectional view of a corner bus connector in position to be installed in the corner of a module.

The front view of corner connector support structure 195 together with portions of the protruding fingers 191 and 193 are shown in FIG. 19. The countersunk regions 201 and 203 prevent the attaching nuts from obstructing or interfering with circuits and devices that will be installed in the module. A sectional view of corner connector support structure 195 and fingers 191 and 193 in position to be attached to corner attachment fixture 178 is shown in FIG. 20. Corner attachment fixtures are adhesively attached to the inside walls of a module at the corners.

Bolt 205 together with a second bolt are molded in to corner attachment fixture 178 in positions to match holes 197 and 199 in the corner connector support structure 195. As shown in FIG. 20, the corner attachment fixture bolts have entered the holes in the corner connector support structure 195 and connector fingers 193 and 191 have made contact with the conductors of buses 175 and 177 respectively but remain unstressed. The attachment process is completed by screwing nuts on the bolts until the connector fingers are fully stressed and making good contacts with the bus conductors as indicated by the corner connector support structure 195 coming into contact with the corner attachment fixture 178.

Sectional views of junction bus 179 and module bus section 177 are shown in FIGS. 21 and 22 respectively. The only difference in the two bus types is that the module bus section 177 has shoulders 213 and 215 which are used in attaching the junction bus connector 181 at any position along the module bus section 177. The platform buses discussed earlier are identical in configuration to the junction bus 179.

A view of the finger configuration of the junction bus connector 181 (FIG. 17) is shown in FIG. 23. The finger assembly is molded into the junction bus connector support structure 217 as shown in FIG. 24. The view of FIG. 24 is the underside of junction bus connector 181 which comes in contact with module bus section 177 and junction bus 179.

The attachment of junction bus connector 181 to module bus section 177 and junction bus 179 is shown in FIG. 25. The attachment is accomplished at the corners of junction bus connector 181 with clamps 219, 221, 223, and 225. The clamping details are illustrated in FIG. 26 using clamp 225 as an example. As shown in the figure, junction bus connector 181, when placed over module bus section 177 and junction bus 179, is supported at a distance 227 above the two buses by the undeflected fingers (not shown in figure) of the junction bus connector. In this condition, the four clamps 219, 221, 223, and 225 can be slipped into position as illustrated for clamp 225 in the figure. Precise alignment of the connector and the buses can be achieved by adjusting the position of the connector until each of the two clamps 223 and 225 are positioned as clamp 225 is in the figure. Note that one side of clamp 225 abuts the edge of junction bus 179 and the opposite side is in the same plane as the edge of junction bus connector 181.

After the clamps are correctly positioned and the junction bus connector is correctly aligned with the buses, Allen screw 229 and the Allen screws associated with clamps 219, 221, and 223 are all screwed into the clamps forcing the junction bus connector support structure 217 to make contact with the underlying buses and causing the fingers of the junction bus connector 181 to deflect and make pressured electrical contacts with their associated bus conductors.

The junction bus connector 181 is symmetrical and thus can be used to connect the module bus 177 to the junction bus 179 from either the left or right sides as the buses are shown in FIG. 25. By rotating junction bus connector 181 90 degrees counterclockwise in FIG. 25, it would connect the right-hand portion of module bus 177 to junction bus 179.

Junction bus termination 183 shown in FIG. 27 consists of rigidly-held conducting fingers 231 with which the flexible fingers of pivoting bus connector 185 connects. The fingers 231 transition into pads 233. The finger assembly is molded into plastic support structure 235. After the pads are connected to the ends of junction bus 179 by soldering or ultrasonic welding and before junction bus connector 181 is connected, junction bus termination 183 and the attached junction bus 179 is inserted behind the already-installed pivoting bus connector 185. At the beginning of the insertion, the upper portion of junction bus 179 rests on top of module bus section 179 and must be tilted away from the module wall. This tilting flexibility is provided by junction bus termination 183 being attached to junction bus 179 only by junction termination pads 233 which permits junction bus 179 to tilt away from surface 237 of junction bus termination support structure 235. After reaching its proper position, junction bus 179 drops down to the module wall in close proximity to module bus section 177. The surface 239 of junction bus termination 183 and junction bus 179 will be held securely against the module wall by sinusoidal spring 241 shown in FIG. 28 at one edge of pivoting bus connector frame 187 and by a second spring on the other side of the frame. The springs are held trapped in the frame as illustrated in the figure for spring 241 with its ends inserted into slots 243 and 245.

Figures 29, 30:
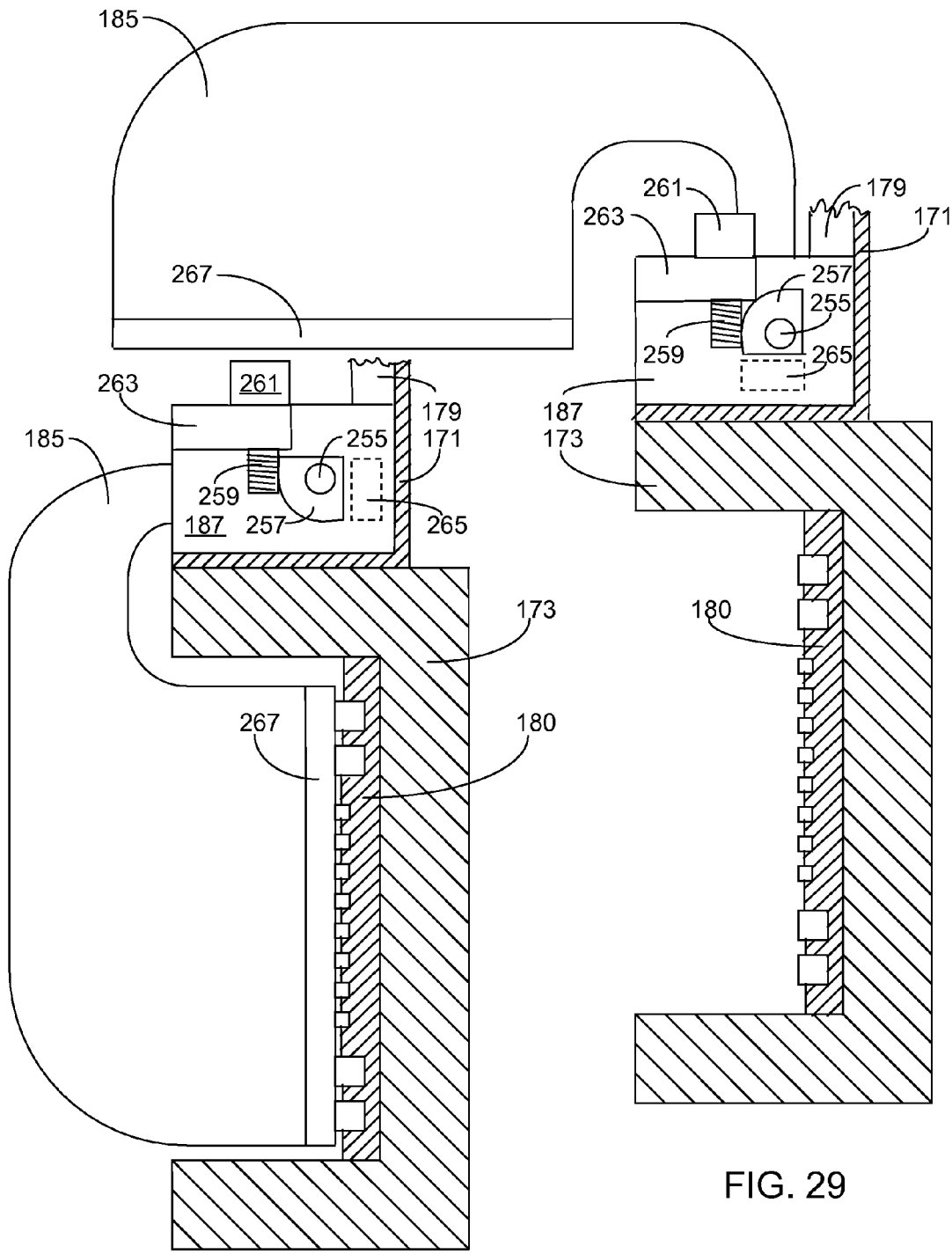
FIG. 29 shows the pivoting bus connector in the parked position.
FIG. 30 shows the pivoting bus connector in the connected position.

Pivoting bus connector 185 (FIG. 17) is shown in greater detail in the sectional views of FIGS. 29 and 30. Pivoting bus connector 185 is shown parked in module 171 above platform 173 in FIG. 29. Pivoting bus connector 185 is rigidly attached to shaft 255 whose ends are supported in frame 187 in a manner which allows the shaft to freely rotate. Worm gear 257 is rigidly attached to shaft 255 and engages worm 259. Worm 259 is rigidly attached to a worm shaft having a hexagonal socket head termination 261 (drivable by an Allen wrench) and constrained within a hole in the frame shelf by worm 259 at one end and hexagonal socket head termination 261 at the other end. The worm shaft is free to rotate and thereby drive worm gear 257 and pivoting bus connector 185 in a ninety-degree arc thereby causing pivoting bus connector 185 to arrive at the position shown in FIG. 30, simultaneously connecting platform bus 180 to junction bus termination 183 which is hidden between the walls of pivoting bus connector frame 187 in FIGS. 29 and 30.

The mounting of pivoting bus connector frame 187 to the module results in hexagonal socket head termination 261 being aligned with module hole 169 (FIG. 17) and also with the corresponding hole in the upper surface of the module. Thus, a user can insert an extended-length Allen wrench through the aligned hole in the upper surface of the module and engage the hexagonal socket head termination 261 to turn the worm 259, thereby either moving the pivoting bus connector 185 from the parked "disconnect" position in the module (FIG. 29) to the operational "connect' position (FIG. 30) wherein platform bus 180 becomes connected to junction bus termination 183 (FIG. 17) or performing the reverse operation which results in platform bus 180 becoming disconnected from junction bus termination 183.

Socket head termination 261 may be driven with an electric motor attached to frame shelf 263 and a user may then access the motor and supply power to it by inserting an extended-length power wand through the aligned hole in the upper surface of the module and into a power receptacle attached to the electric motor.

The dashed outline of finger assembly 265 in FIGS. 29 and 30 shows the position of the finger assembly that attaches to the conductors at the end of pivoting bus connector 185 and makes the connection to the fingers of junction bus termination 183 which is hidden within the walls of pivoting bus connector frame 187 and which connects to junction bus 179. A similar finger assembly 267 attaches to the conductors at the other end of pivoting bus connector 185 and makes the connection to the conductors of platform bus 180.

The pivoting bus connector 185 is an assembly of conductors terminated on one end with finger assembly 267 consisting of a plurality of vertically-oriented linear array of flexible conducting fingers which are intended to make contact with the conductors of the platform bus 180 and terminated on the other end with finger assembly 265 consisting of a horizontally-oriented linear array of flexible conducting fingers which are intended to make contact with the conducting fingers of the junction bus termination 183 (FIG. 17).

Figure 31:
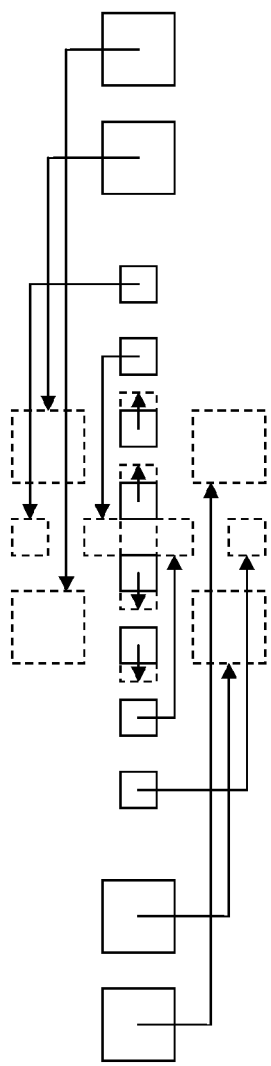
FIG. 31 shows how the conductors in the pivoting bus connector are transitioned from a linear configuration to a square configuration.

The pivoting-connector conductors emerge from finger assembly 267 as a vertically-oriented array shown in FIG. 31 as solid-line squares. Each conductor is subject to a series of bends about axes normal to the sides of the conductors including a ninety-degree change in direction which bring them into the square configuration of dashed squares shown in FIG. 31. This square configuration is achieved when all of the conductors are aligned vertically in FIG. 30. The transition from a linear configuration to a square configuration requires the conductors to be displaced by bends as indicated by the arrows in FIG. 31.

Figure 32:
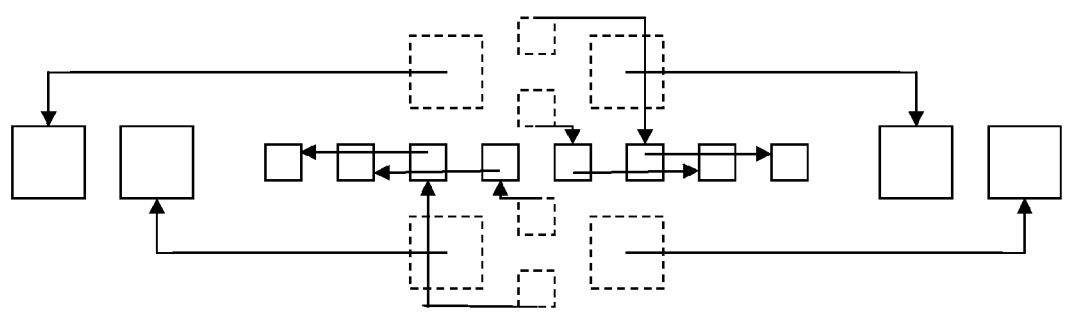
FIG. 32 shows how the conductors in the pivoting bus connector are transitioned from a square configuration to a linear configuration.

Each conductor is then subject to a series of bends about axes normal to the sides of the conductors including a ninety-degree change in direction which brings them into the linear horizontally-oriented configuration of solid-line squares shown in FIG. 32. The transition from the square configuration to the linear configuration requires displacements of the conductors as indicated again by the arrows.

A yoke for attaching shafts to the pivoting bus connector surrounds the conductor assembly at the pivot axis. The yoke, shown in FIG. 33, has two tapped holes 275 and 277 on the pivot axis to receive shafts with threaded ends that pass through holes in the side walls of pivoting bus connector frame 187 (FIG. 17) and screw into the tapped holes in the yoke.

Finger assemblies 265 and 267 with individually-flexible fingers for making electrical contact with the platform bus 180 and the junction bus termination 183 (FIG. 17), like that shown in FIG. 34, are attached to each end of the conductor assembly by soldering or ultrasonic welding. The resulting combination of conductor assembly, yoke, and finger assemblies are molded into plastic thereby completing the fabrication of the pivoting bus connector. The dashed outline 279 shows the plastic support structure that encompasses the conductor assembly and the attachment ends of the finger assembly at each end of the pivoting bus connector after the molding process has been completed.

The pivoting bus connector 185 connects to the platform bus by essentially a linear motion normal to the platform bus. First, the fingers 281 contact the bus conductors and then individually and elastically bend as they move closer to the bus conductors thereby applying forces to the contacting portions of the fingers and securing good electrical connections.

The pivoting bus connector 185 connects to the junction bus termination 183 by a rotating motion as shown in FIG. 35. The frame 187 of the pivoting bus connector 185 abuts wall 283 and is bolted to floor 285 of module 171 (FIG. 17). The fingers 287 of finger assembly 265 are shown in the "parked"

position 287-P that corresponds to the parked position of the pivoting bus connector 185 (see FIG. 29). As the pivoting bus connector 185 rotates, the fingers 287 rotate with the straight ends touching inner circle 289 and the curved ends touching outer circle 291. The fingers remain undeflected during the ninety-degree rotation of the pivoting bus connector until they reach the "touching" position 287-T where they touch the ends of the junction bus termination fingers 231 (FIG. 27). Further rotation causes the fingers to bend elastically until they achieve the "maximum bending" position 287-MB and good electrical connections to the junction bus termination fingers after a full ninety-degree rotation of the pivoting bus connector.

Figure 36:
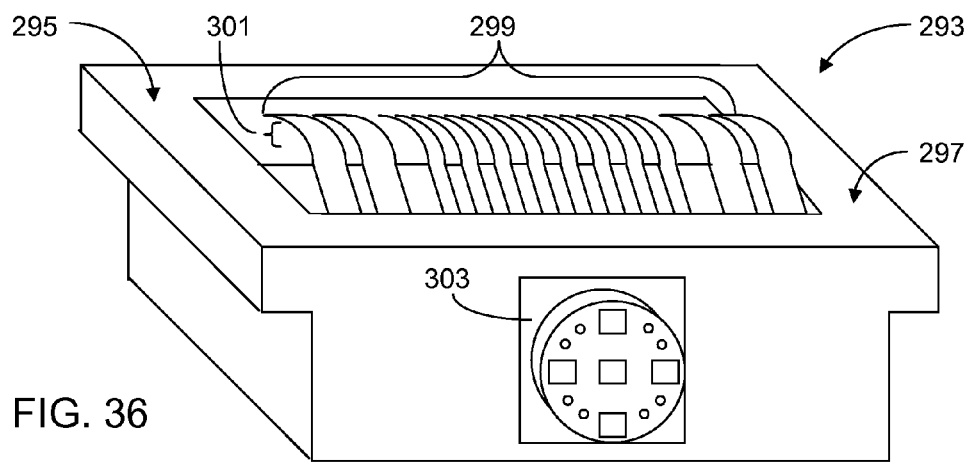
FIG. 36 is a perspective view of the bus connector utilized in connecting electronic devices and circuits within a module to the module bus system.

Electrical connections to electrical and electronic devices and equipments within a module are accomplished by any of a wide variety of conventional wiring means and bus connector 293 shown in FIG. 36. Bus connector 293 is clamped to the module bus using clamps like clamp 225 shown in FIG. 26 in a fashion similar to the way junction bus connector 181 is clamped to module bus 177 (see FIG. 25). Bus connector 293 may be attached wherever on the module bus is most convenient for wiring, and the clamps may be placed anywhere along the two sides of the connector which are above the shoulders 213 and 215 of module bus 177 (see FIG. 22).

The clamping of bus connector 293 to module bus 177 results in the surfaces 295 and 297 of bus connector 293 being in intimate contact with the top surfaces of shoulders 213 and 215 (FIG. 22) of module bus 177. This positioning results in bus connector fingers 299 flexing to the degree 301 necessary to make good electrical contacts with the module bus conductors and also limits the flexing to the elastic region.

Bus connector fingers 299 are electrically connected by a rigid conductor assembly to the receptacle contacts of any type connector preferred by the user. Circular plastic connector (CPC) 303, capable of handling up to eight signal conductors and five power conductors, is shown in FIG. 36. A plurality of receptacles may be provided on a single bus connector 293 utilizing any or all of the five surfaces (bottom and four sides). The receptacles may be the same or different depending upon the user's preferences.

Bus connector 293 is molded into plastic and becomes the bus connector shown in FIG. 36 except for possibly having a plurality of receptacles available instead of just one.

Figure 37:
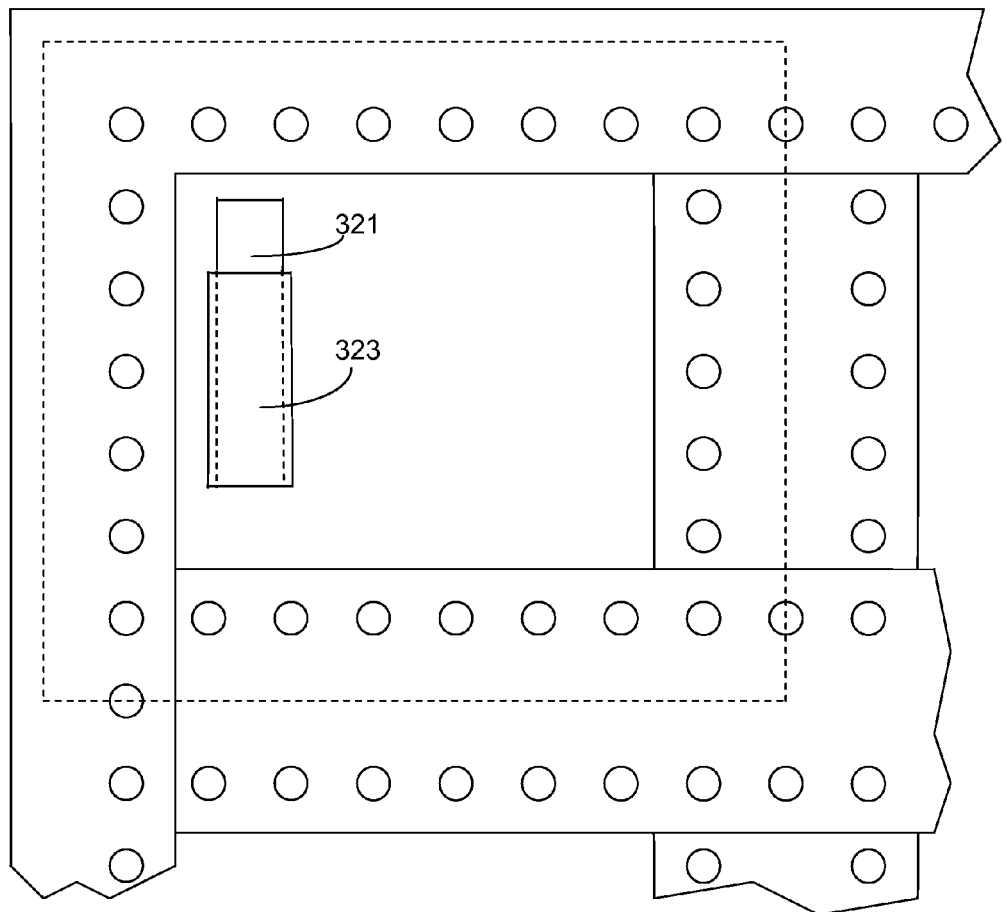
FIG. 37 is a plan view of a module floor and the opening through which the pivoting bus connector moves in connecting to the frame or another module.
Figure 38:
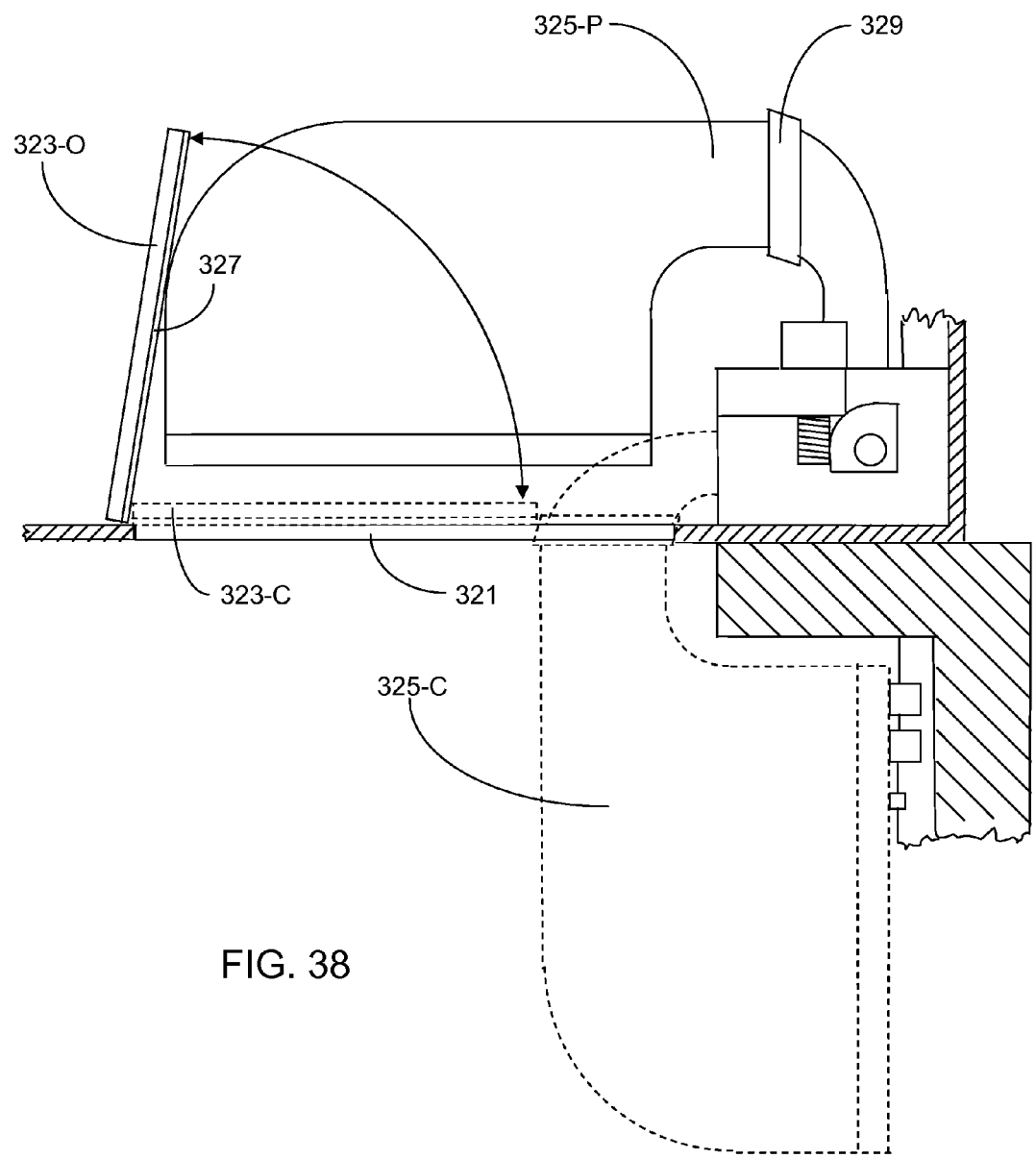
FIG. 38 shows how a dust-free environment is maintained in a module after a pivoting bus connector connects the bus system of the module to the bus system of the frame or another module.

In order for the pivoting bus connector in a module to connect to a bus beneath the module, there must be an opening in the floor of the module. For the embodiment of the invention described herein (see FIG. 4), the rectangular opening 321 shown in FIG. 37 would suffice. In order to maintain a dust-free environment within the module, hinged spring-loaded cover 323 covers the portion of the opening not occupied by the pivoting bus connector after the pivoting bus connector moves from the "parked" position to the "connect" position. The manner in which the cover is opened and closed is illustrated in FIG. 38.

When the pivoting bus connector 325 is in the "park" position 325-P, the cover 323-O is open and leaning against the pivoting bus connector. The cover 323 is spring-loaded so that a force is continually being applied to the cover to cause it to move to the closed position unless it is prevented from doing so by the pivoting bus connector.

When the pivoting bus connector 325 moves to the "connect" position 325-C, the cover 323 shown in the open position 323-O follows it down to the closed position 323-C and closes the portion of opening 321 not occupied by the pivoting bus connector. In order to maintain a dust-free environment when the pivoting bus connector 325 is in the connect position 325-C an elastically-compressible dust seal 327 is attached to cover 323 on its perimeter and elastically deforms to seal that portion of opening 321 where the cover abuts the opening. An elastically-compressible dust seal 329 surrounds the neck of the pivoting bus connector and elastically deforms to seal that portion of opening 321 that surrounds the neck when the pivoting bus connector is in the "connect" position 325-C.

What is claimed is:

1. A modular assembly of modular objects for autonomously executing tasks comprising:
   a modular assembly system utilizing modular object fasteners (MOFs) and MOF-accommodating features of modular objects for facilitating the attachment of a plurality of modular objects to one another to create a modular assembly in any one of a plurality of configurations, the modular assembly system facilitating the detachment of modular objects in an assembly and the reattachment of the same or different modular objects to form a different configuration of the modular assembly or a different modular assembly, an MOF being activatable when object attachment surfaces associated with two modular objects are superimposed and two object attachment points on the object attachment surfaces coincide;
   a modular object called a platform comprising a frame of interconnected beams and any cross-members attached to the frame, the frame being amenable to the attachment and detachment of cross-members within the frame, beams and cross-members being structural members consisting of one or more parallel flanges and one or more webs normal to the flanges, coplanar exterior surfaces of the flanges of the beams and cross-members constituting object attachment surfaces with object attachment points designated thereon, the web surfaces of the beams and cross-members constituting bus-attachment surfaces;
   one or more modular objects called modules, a module having at least one object attachment surface with object attachment points designated thereon, the interior surfaces of a module being bus-attachment surfaces, a module being attachable to a platform or to another module when one or more of the object attachment points on an object attachment surface of the module coincide with one or more object attachment points on an object attachment surface of the platform or the other module;
   a modular bus system for distributing electrical power and electrical signals among a plurality of modular objects in a modular assembly, the modular bus system comprising modular-object bus systems attached to one or more bus-attachment surfaces within each modular object, one or more inter-object bus connectors for electrically connecting the plurality of modular-object bus systems to one another, and one or more intra-object bus connectors for enabling the flow of electrical power and electrical signals between the bus system of a modular object and units within the modular object.

2. The modular assembly of claim 1 wherein the modular assembly system comprises:
   one or more object attachment surfaces associated with each modular object;
   a plurality of object attachment points designated on each object attachment surface, the object attachment points of each object attachment surface being congruent with points on an attachment point pattern, the attachment point pattern being the points in a plane corresponding to the intersections of equally-spaced x-lines and y-lines, the x-lines being parallel to the x-axis and the y-lines being parallel to the y-axis in an x-y Cartesian coordinate system;

a fastening system for attaching one modular object to another at coinciding object attachment points, the fastening system comprising modular object fasteners (MOFs) working in conjunction with MOF-accommodating features of the modular objects, an MOF being a device or a combination of devices which, when activated, in combination with MOF-accommodating features of two modular objects applies opposing forces to the two modular objects at coinciding object attachment points thereby holding the two objects together at the coinciding object attachment points, the forces applied to two modular objects by an MOF being removed when the MOF is deactivated.

3. The modular assembly of claim 1 wherein the web of a cross-member attached to a beam or another cross-member extends into the interior region of the beam or the other cross-member bounded by the interior surfaces of a flange and a web of the beam or the other cross-member and having a web attachment axis within the web and normal to the flange of the cross-member, a first cross-member being attachable at each end to a beam or to a second cross-member by a cross-member attachment system comprising a cross-member fastener (CF) acting in concert with CF-accommodating features of the first cross-member and the platform beam or the second cross-member, a CF being activatable when the web attachment axis of the first cross-member is normal to an object attachment surface and passes through an object attachment point of the object attachment surface of a platform beam or a second cross-member.

4. The modular assembly of claim 3 wherein the CF is a pin terminated at one end by a threaded region, the CF-accommodating features of the first cross-member being a hole through the web coaxial with the web attachment axis at each end of the first cross-member, the CF-accommodating features of the beam and second cross-member being holes in the flanges concentric with object attachment points and having threaded regions beginning at the object attachment surfaces and extending part way through the flanges.

5. The modular assembly of claim 1 wherein the modular object fasteners (MOFs) utilized in attaching a modular object to a platform are bolts, the MOF-accommodating features of a platform being holes concentric with object attachment points, the portions of the holes adjacent to the object attachment surface being threaded so as to engage the threaded ends of the bolts.

6. The modular assembly of claim 1 wherein a modular object fastener (MOF) is activated or deactivated by means of an MOF tool having access to the MOF through an access opening in a wall of a module.

7. The modular assembly of claim 6 wherein an access opening is centered on an object attachment point of the module.

8. The modular assembly of claim 6 wherein an object attachment point of a module is the location of an access opening and also is a location which may be used in attaching another module to the module.

9. The modular assembly of claim 1 wherein the MOFs are bolts, the MOF-accommodating features of a module to be attached to a platform or to another module being holes in the module wall that contacts the platform or the other module, the holes being sized to receive the bolts and concentric with object attachment points associated with the module wall.

10. The modular assembly of claim 1 wherein the MOFs are bolts, the MOF-accommodating features of a module to which another module is to be attached being holes in the module wall that the other module contacts, the holes being threaded so as to engage the bolts and being concentric with the object attachment points associated with the module wall.

11. The modular assembly of claim 1 wherein a modular-object bus system comprises one or more interconnected bus sections attached to the interior surfaces of a modular object, adjoining bus sections being connected by an intra-object bus connector utilizing a support structure attached to the modular object at one or more object attachment points.

12. The modular assembly of claim 1 wherein a modular object bus system comprises one or more interconnected bus sections attached to the interior surfaces of a modular object, adjoining bus sections being connected by an intra-object bus connector utilizing a support structure attached to one or more walls of the modular object.

13. The modular assembly of claim 1 wherein a modular-object bus system comprises a first bus section and a second bus section, the conductors of the second bus section being normal to the conductors of the first bus section, an intra-object bus connector connecting the second bus section to the first bus section in any one of a range of positions in a direction parallel to the conductors of the first bus section.

14. The modular assembly of claim 1 wherein intra-object bus connectors are attached to the ends of a cross-member, the intra-object bus connectors automatically connecting bus sections attached to the cross-member to bus sections attached to beams or to other cross-members as the cross-member is installed in a platform.

15. The modular assembly of claim 1 wherein an inter-object bus connector (IOBC) is mounted within a module for the purpose of connecting the bus system of the module to the bus system of a modular object to which the module is attached.

16. The modular assembly of claim 15 wherein an IOBC has an IOBC attachment surface with one or more IOBC attachment points, the one or more IOBC attachment points being congruent with object attachment points of the module to which the IOBC is to be mounted, the mounting of the IOBC being accomplished with IOBC fasteners and IOBC-fastener-accommodating features of the IOBC and the module, the IOBC being attachable to the module when one or more of the IOBC attachment points coincide with the module's object attachment points.

17. The modular assembly of claim 16 wherein the IOBC fasteners are bolts, the IOBC-fastener-accommodating features of the IOBC being threaded holes, and the IOBC-fastener-accommodating features of the module being holes sized to receive the bolts.

18. The modular assembly of claim 15 wherein an IOBC has a drive mechanism for connecting and disconnecting the bus systems, the drive mechanism being operable by a user from outside the module containing the IOBC.

19. The modular assembly of claim 18 wherein the drive mechanism comprises a rotary driver and a transmission having an input shaft linked mechanically to an output shaft, a given angular displacement of the input shaft resulting in a smaller angular displacement of the output shaft.

20. The modular assembly of claim 19 wherein the rotary driver is a wrench coupling attached to the input shaft of the transmission.

21. The modular assembly of claim 19 wherein the rotary driver is an electric motor coupled to the input shaft of the transmission.

22. The modular assembly of claim 19 wherein the transmission comprises a worm engaging with and driving a worm gear.

23. The modular assembly of claim 15 wherein an IOBC comprises a pivoting bus connector rotatably mounted in a pivoting-connector frame and a drive mechanism, the pivoting-connector frame having an IOBC attachment surface with one or more IOBC attachment points congruent with one or more object attachment points of the module to which the IOBC is to be attached, the driving mechanism enabling a user by actions performed outside the module to which the IOBC is attached to move the pivoting bus connector from a parked position within the module to a connected position whereby the bus system in the module is connected to the bus system of the platform or other module to which the module is attached.

24. The modular assembly of claim 15 wherein the IOBC comprises two orthogonal linear arrays of conducting fingers, pairs of corresponding fingers in the two arrays being electrically connected by an assembly of conductors.

25. The modular assembly of claim 15 wherein the connection of the bus systems of two modular objects by an IOBC automatically causes the sealing of the modular object in which the IOBC is mounted from the entry of dust.

* * * * *